US010162914B1

(12) United States Patent
Krishnamurthy et al.

(10) Patent No.: US 10,162,914 B1
(45) Date of Patent: Dec. 25, 2018

(54) APPARATUS AND METHOD TO FORCE EQUIVALENT OUTPUTS AT START-UP FOR REPLICATED SEQUENTIAL CIRCUITS

(71) Applicant: Apple Inc., Cupertino, CA (US)

(72) Inventors: Harsha Krishnamurthy, San Jose, CA (US); Suparn Vats, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/673,467

(22) Filed: Aug. 10, 2017

(51) Int. Cl.
*G01R 31/3177* (2006.01)
*G06F 17/50* (2006.01)
*G06F 17/30* (2006.01)
*H03K 19/003* (2006.01)
*G01R 31/3183* (2006.01)
*G01R 31/3185* (2006.01)

(52) U.S. Cl.
CPC . *G06F 17/5022* (2013.01); *G01R 31/318392* (2013.01); *G01R 31/318552* (2013.01); *G06F 17/30094* (2013.01); *G06F 17/30492* (2013.01); *G06F 17/5045* (2013.01); *H03K 19/00307* (2013.01)

(58) Field of Classification Search
CPC .... G01R 31/318392; G01R 31/318552; G06F 17/30094; G06F 17/30492; G06F 17/5022; G06F 17/5045; H03K 19/00307
See application file for complete search history.

(56) References Cited

U.S. PATENT DOCUMENTS

| 6,278,302 | B1* | 8/2001 | El-Kik | H03K 17/22 327/143 |
|---|---|---|---|---|
| 7,400,179 | B2 | 7/2008 | Lin | |
| 7,965,113 | B2 | 6/2011 | Fuller | |
| 8,493,109 | B2* | 7/2013 | Millendorf | G06F 1/24 327/142 |
| 9,081,556 | B2 | 7/2015 | Paaske | |
| 9,496,851 | B2 | 11/2016 | Counts | |
| 2005/0253638 | A1* | 11/2005 | Dietrich | G06F 1/24 327/198 |
| 2006/0184852 | A1* | 8/2006 | Chu | G06F 11/24 714/746 |
| 2008/0122512 | A1* | 5/2008 | Lin | G06F 1/24 327/198 |
| 2009/0024888 | A1* | 1/2009 | Kurimoto | G01R 31/31858 714/731 |
| 2009/0153182 | A1* | 6/2009 | Yamaoka | H03K 19/00346 326/16 |

* cited by examiner

*Primary Examiner* — Alexander H Taningco
*Assistant Examiner* — Kurtis R Bahr
(74) *Attorney, Agent, or Firm* — Meyertons, Hood, Kivlin, Kowert & Goetzel, P.C.; Erik A. Heter

(57) ABSTRACT

A method and apparatus for forcing equivalent outputs at start-up for replicated sequential circuits is disclosed. An integrated circuit (IC) includes first and second clocked logic circuits each coupled to receive a clock signal common to both, and each configured to produce equivalent logical outputs based on a common set of logic inputs. The IC further includes an equivalence circuit coupled to the outputs of each of the first and second clocked logic circuits. During a system start-up (e.g., power on) and before the clock signal has been applied, the equivalence circuit may detect if the outputs of the to first and second clocked logic circuits originally come up in different states. Responsive to determining that the outputs of the first and second clocked logic circuits are different, the equivalence circuit may cause the outputs to be forced to the same logical state.

17 Claims, 8 Drawing Sheets

APPARATUS AND METHOD TO FORCE EQUIVALENT OUTPUTS AT START-UP FOR REPLICATED SEQUENTIAL CIRCUITS

BACKGROUND

Technical Field

This disclosure is directed to electronic circuits, and more particularly, to replicated sequential circuits.

Description of the Related Art

Clocked logic circuits, such as flip-flops (and more generally sequential circuits), are widely used in digital integrated circuits. For example, in a data path of a processor, clocked logic circuits are implemented to allow for the orderly and timed, synchronized movement of data from one location to another.

In various integrated circuits, some clocked logic circuits may be required to drive a large number of loads, physically disparate loads, or provide its respective output to a number of other circuits that consume the output. The number of circuits driven by a given logic circuit is commonly known as fan-out. In some cases, when the fan-out of a given clocked logic circuit is high, additional measures may be taken to ensure that each circuit that is a consumer of its output may receive the signal at appropriate levels or within a certain time (latency). One method for dealing with high fan-out of clocked logic circuits is to replicate, or clone the clocked logic circuit. That is, one or more of the clocked logic circuit is created, with both the original and its clone(s) connected to the same input logic. Since each of the clones of the original clocked-logic circuit are identically configured, their respective outputs should be the same for a given logic input or set thereof (since these are shared as well). Thus, with multiple instances of a given logic circuit, the fan-out may be divided among them so that each instance has the desired fan-out.

SUMMARY

A method and apparatus for forcing equivalent outputs at power-up for replicated sequential circuits is disclosed. In one embodiment, an integrated circuit (IC) includes first and second clocked logic circuits each coupled to receive a clock signal common to both, and each configured to produce equivalent logical outputs based on a common set of logic inputs. The IC further includes an equivalence circuit coupled to the outputs of each of the first and second clocked logic circuits. During a system start-up (e.g., power on) and before the clock signal has been applied, the equivalence circuit may detect if the outputs of the first and second clocked logic circuits originally come up in different states. Responsive to determining that the outputs of the first and second clocked logic circuits are different, the equivalence circuit may cause the outputs to be forced to the same logical state.

In one embodiment, the equivalence circuit may assert an enable signal to a clock gating circuit. Responsive to receiving the enable signal, the clock gating circuit may enable the clock signal to pass to the clocked-logic circuits, thereby causing both to consume their logically equivalent input(s) and thus produce logically equivalent outputs. In some embodiments, the equivalence circuit may cause additional clock gating circuits at different levels of a clock tree to be enabled in order to ensure that the clock signal is passed to the clocked logic circuits.

Embodiments are also possible and contemplated in which a given clocked logic circuit is replicated multiple times (e.g., two or more). In such embodiment, the equivalence circuit may determine whether the logic outputs of the original and replicated clocked logic circuits are in the same state, and cause an equivalency to be forced there between if not. In some embodiment, if the logical inputs to replicated clocked logic circuits come from different (but logically equivalent) sources, the equivalence circuit may also force the logical inputs to suitable equivalent values.

BRIEF DESCRIPTION OF THE DRAWINGS

The following detailed description makes reference to the accompanying drawings, which are now briefly described.

Figure 1:
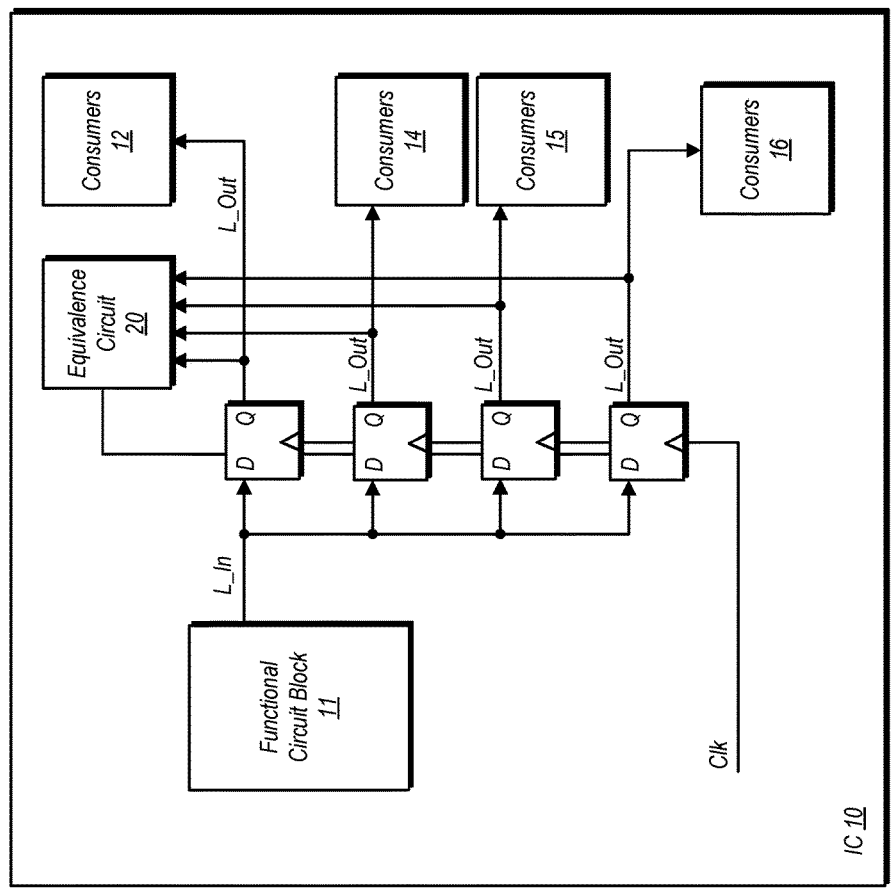
FIG. 1 is a block diagram of one embodiment of an integrated circuit including replicated clocked logic circuits and an equivalence circuit.
Figure 1:
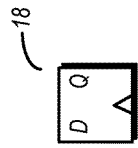

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

FIG. 1 is a block diagram of one embodiment of an integrated circuit (IC) having replicated sequential (or clocked logic) circuits. The embodiment of IC 10 shown here is for illustrative purposes, and is not meant to be limiting.

It is noted herein that the terms "sequential circuits", "clocked logic circuits", "latches, and "flops" may be used interchangeably. Generally speaking, reference to any of these terms can be interpreted as a logic circuit in which a change to its output signal depends not only on a change to the logical inputs thereto, but on receipt of a clock signal as well (e.g., a rising edge of a clock signal). It is further noted that while the various instances of clocked logic circuit 18 shown herein are depicted as D-type flip-flops, their use here is exemplary, as the sequential circuits discussed herein may be virtually any type of clocked logic circuits, including clock level sensitive latches.

In some ICs, certain clocked logic circuits (e.g., flip-flops, latches, etc.) may provide an output signal that is received by a number of consumers, or other logic circuits (which may be sequential or combinational). In some cases, the number of consumers can exceed the number of gates that can be driven by the clocked logic circuit providing the output signal (e.g., exceeds its fan-out) or the consumers can be physically disparate. One method of overcoming this issue is to replicate, or provide clones of, the particular clocked logic circuit that provides the particular output signal. The input logic may be provided to each of the replicated sequential circuits, with each of them providing respective output signals that are effectively duplicates of one another. The number of replicated sequential circuits may be determined based on the number of circuits that make up the various consumers of the logic signal. By providing a sufficient number of clones of the original sequential circuit, the fan-out for any one may be within prescribed limits.

During system start up (e.g., when the IC is first powered on), the output states of various replicated sequential circuits cannot be guaranteed to be at the same logical value. Thus, for replicated sequential circuits, it is possible that, at start-up, their outputs may be in different logical states despite sharing a common logic input. If these different logic states are allowed to be consumed by the various consumer circuits, erroneous operation can occur and thus lead to a malfunction of the IC. Accordingly, various embodiments of an equivalence circuit and a methodology to force equivalency of outputs provided from replicated sequential circuits is provided.

IC 10 in the embodiment shown includes an exemplary functional circuit block 11, a number of clocked logic circuits 18 (which are clones of one another), various consumers 12, 14, 15, and 16, and an equivalence circuit 20. The clocked logic circuits 18 as shown here are functionally identical circuits, and thus provide equivalent logic outputs based on having the same logic inputs (although it is noted that embodiments are possible and contemplated where replicated flops may intentionally provide output that are logical inversions of one another). The consumers may be any type of logic circuitry, combinational or sequential, that may consume output signals received from the various instances clocked logic circuit 18. Within each consumer, the logic signal may be provided to inputs of a number of different circuits (e.g., to the inputs of multiple logic gates). Each of the clocked logic circuits 18 in the embodiment shown is coupled to receive the same logic signal, L_In, from functional circuit block 11. Each of the clocked logic circuits 18 is arranged to provide to its respectively coupled consumers an instance of a logic signal, L_out. Since the input logic signal, L_In, is shared by each of the clocked logic circuits 18, it follows that the instances of L_Out are logically equivalent to one another at any given time during normal operation.

However, as noted above, despite sharing the same logic input, one or more of the clocked logic circuits 18 may come up in a different state and thereby logical outputs with respect to the others during a start-up/power on phase. Equivalence circuit 20 in the embodiment shown is coupled to the outputs of each of the clocked logic circuits 18, and may detect whether one or more instances of L_out is in a different logic state with respect to other instances of the same. Responsive to detecting that one or more instances of L_out is in a different logic state with respect to other instances, equivalence circuit 20 may perform actions to force each into an equivalent logic state. For example, if one instance of L_out comes up as a logic 0 during start-up, while the other instances thereof are logic 1's, equivalence circuit 20 may detect this and perform actions to force each instance of L_out into a logic state (logic 0 or logic 1) that corresponds to the expected output state based on logic input, L_In. This may occur as part of the start-up phase, and before the various consumers can consume the logic signal L_Out. The equivalence circuit 20 may trigger once, if at all, when the clock signal reaches the clock gating circuit that feeds the clock signal to the replicated sequential circuits (as further discussed below). Thereafter, the presence of equivalence circuit 20 is effectively redundant or inactive during normal operation, since the replicated sequential circuits provide equivalent (or desired) outputs thereafter based on the common logic input(s), with exception of the case where a soft error may occur (in which case the equivalence circuitry may correct the soft error). Equivalence circuit 20 may be implemented using any circuitry that allows for detection of difference between logic values in two or more logic signals. Various embodiments of an equivalence circuit 20 and the various mechanisms for forcing equivalence of the outputs provided by a group of replicated sequential circuits will now be discussed further.

Figure 2:
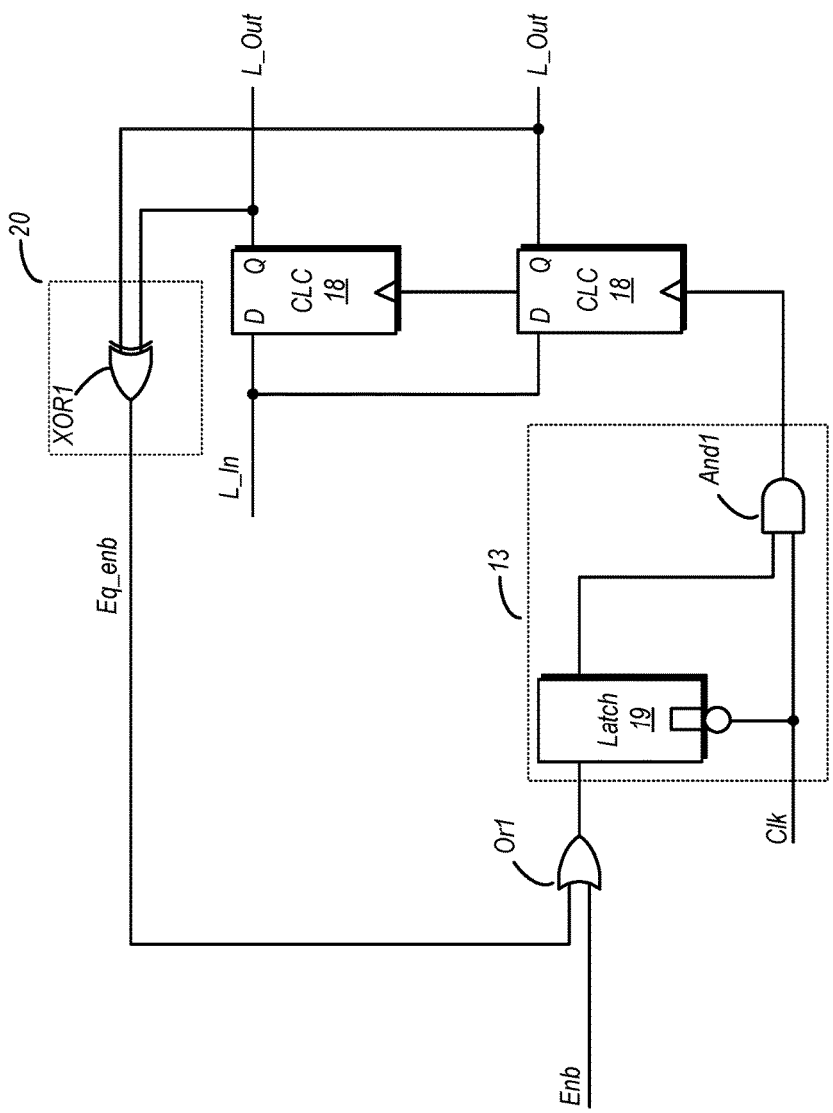
FIG. 2 is a diagram illustrating one embodiment of an equivalence circuit implemented for clocked logic circuit and its clone.

FIG. 2 is a diagram illustrating one embodiment of an equivalence circuit implemented for clocked logic circuit and its clone. In the embodiment shown, two instances of clock logic circuit (CLC) 18 are shown here, each coupled to receive a logic signal, L_In, and provide logically equivalent instances of L_Out. The sources and consumers of these signals are not shown here for the sake of simplicity.

Each of CLCs 18 in the illustrated example is coupled to receive a clock signal, Clk, via a clock gating circuit 13. The clock gating circuit 13 includes a latch 19 and a 2-input AND gate, And1, each of which is coupled to receive the clock signal (on a clock input in the case of latch 19). Latch 19 may also receive an enable signal, Enb, via an OR gate, Or1. When the enable signal is asserted, each low clock pulse to latch 19 may latch the signal on its input to its output. When the output of the latch 19 is a logic 1, the high (equivalent to logic 1) portion of the clock signal may propagate through to the clock inputs of CLCs 18. During normal operation when the circuits shown in FIG. 2 are active, the enable signal, Enb, may be asserted to allow the clock signal to propagate through clock gater 13. If the circuitry shown in FIG. 2 is idle, the enable signal may be de-asserted to save clock power. Furthermore, during the start-up/power on phase, the enable signal (which may be received from power management circuitry, a clock control unit, or other source) may also be de-asserted to allow all circuits sufficient time to power up and stabilize.

In this particular embodiment, equivalence circuit 20 is implemented using an exclusive-OR (XOR) gate, XOR1. If both instances of L_Out are the same values during start-up/power on, the output of XOR1 is a logic 0. However, if the two instances of L_Out do not match in logic value, XOR1 will output a logic 1, which is conveyed as the signal Eq_enb to Or1. The asserted Eq_enb may propagate through Or1 to the input of latch 19, being latched to the correspondingly coupled input of And1 on the next low portion of the clock cycle. When the next high portion of the clock signal arrives at the other input of And1, a clock pulse is allowed to propagate to CLCs 18. This clock pulse may then cause the capture of the state of input L_In to both CLCs 18, and thus to their respective outputs. At this point, both instances of L_Out in the illustrated embodiment are at equivalent logic values, and thereafter XOR1 will discontinue assertion of the Eq_enb signal.

Generally speaking, in the illustrated embodiment, equivalence circuit 20 asserts the Eq_enb signal only when there is a mismatch between the various instances of L_Out. Since this may occur primarily during a start-up phase or when the illustrated circuitry is coming out of a powered-down condition, Eq_enb is not asserted during normal operation. Accordingly, the clock gater 13 may either pass or inhibit the clock signal in accordance with the state of the main enable signal when the circuit is operating as normal. The assertion of Eq_enb in this example allows for the clocking of an input to CLCs 18 to their respective outputs at a time when the clock signal might otherwise be inhibited by clock gater 13.

Figure 3:
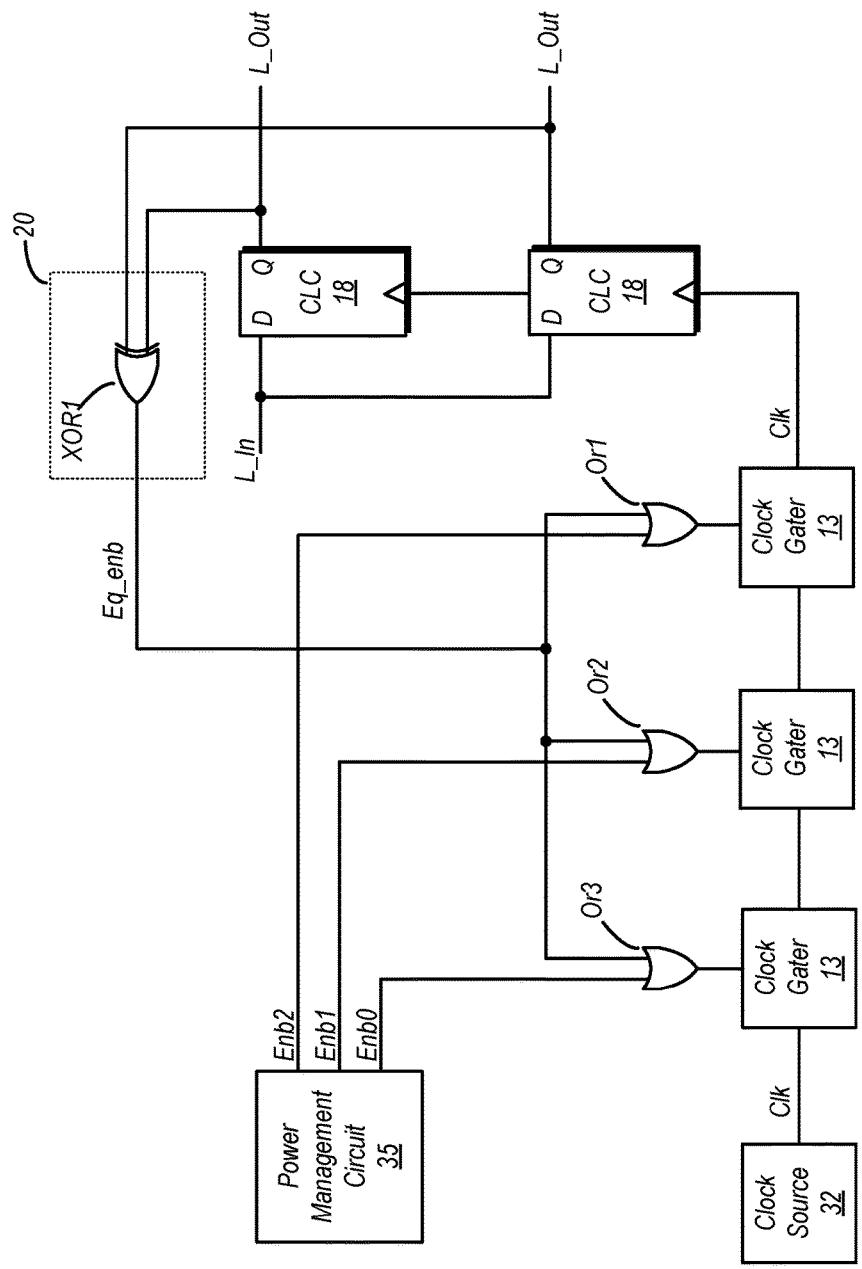
FIG. 3 is a diagram illustrating one embodiment of an equivalence circuit arranged to enable a number of clock gating circuits at different levels in a clock tree.

In some embodiments of an IC, a clock signal may be distributed via a clock tree that includes a number of levels. A clock gater on the level closest to the circuitry receiving the clock signal may be referred to as a leaf-level clock gater. A clock gater that is closest to the source of the clock signal may be referred to as a root level clock gater. Clock gaters on levels other than the leaf or root levels may be referred to as intermediate level clock gaters. In some embodiments of an IC, the clock signal may be gated at a number of different levels during start-up/power on. Accordingly, it may be necessary to enable a number of clock gaters at different levels to ensure affected instances of CLC 18 may receive a clock signal when their respective outputs are not initially equivalent. FIG. 3 is a diagram illustrating one embodiment of an equivalence circuit arranged to enable a number of clock gating circuits at different levels in a clock tree.

In the illustrated embodiment, a number of clock gaters 13 are implemented at different levels of a clock tree. Each of the clock gaters 13 may be enabled responsive to assertion of corresponding ones of the enable signals, Enb0, Enb1, and Enb2, by power management circuit 35. During the initial start-up/power phase, power management circuit 35 may not assert these enable signals. However, if the instances of L_Out are mismatched during this phase, assertion of the Eq_enb may enable clock gaters 13 on multiple levels (e.g., through Or1, Or2, and Or3). This in turn may allow the clock signal to propagate from clock source 32 to the clock input of each CLC 18 shown here. It is noted that XOR1 will hold Eq_enb as long as the two instances of L_Out are logically mismatches, thereby allowing sufficient time for the clock signal to propagate through the various clock gaters 13.

Figure 4:
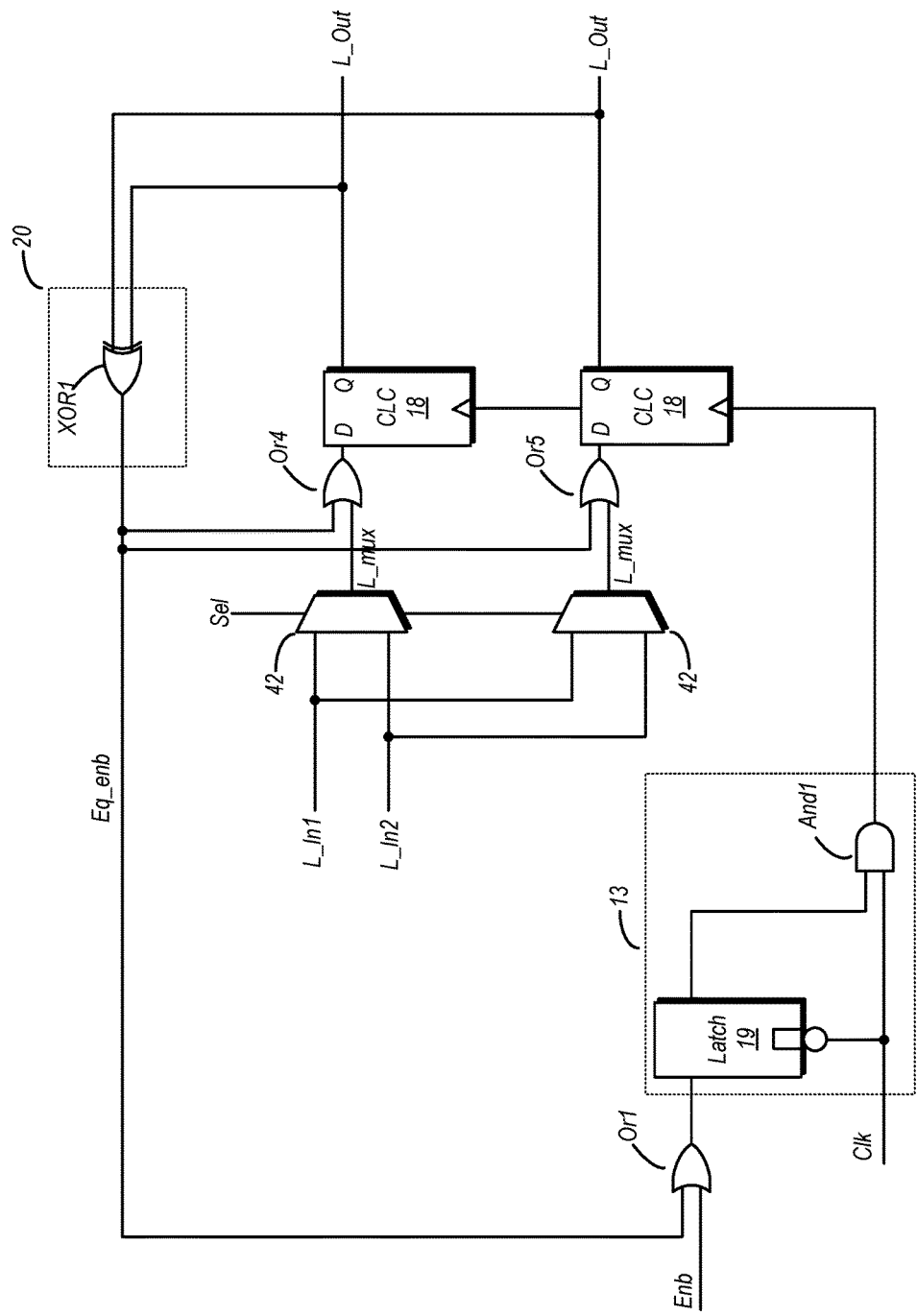
FIG. 4 is a block diagram illustrating one embodiment of an equivalence circuit arranged to force equivalence between two physically separate but logically equivalent inputs provided to two separate clocked logic circuits.

In some cases, it is possible that replicated sequential circuits may receive logically equivalent inputs on separate signal paths. FIG. 4 illustrates one such embodiment. In the illustrated embodiment, the output of CLCs 18 are based on the input signals L_In1 and L_In2, which are both provided to two different multiplexers 42. The multiplexers 42 share a common select signal, and thus, their respective outputs (the instances of L_mux shown here) are logically equivalent. These logically equivalent signals may be provided as inputs to respectively coupled CLCs 18, via Or4 and Or5.

Although the instances of L_mux are arranged to be logically equivalent during normal operation, it is possible that the outputs of the two separate multiplexers may come up in different logical states. Thus, in this particular embodiment, the circuit is arranged such the assertion of Eq_enb by equivalence circuit 20 may force equivalence between the two instances of L_mux, as well as the two instances of L_Out. As shown in FIG. 4, the Eq_enb signal is provided to both Or4 and Or5. This in turn forces the inputs of both CLCs 18 to equivalent states when Eq_enb is asserted. Additionally, the Eq_enb signal is provided to Or1, which in turn enables clock gater 13 to convey the clock signal to each CLC 18. When the clock pulse is received by each CLC 18, the inputs to these circuits, forced into logical equivalence, will be captured and conveyed to their respective L_out signal paths. Thus, the outputs of CLCs 18 are also forced into equivalence.

Figure 5:
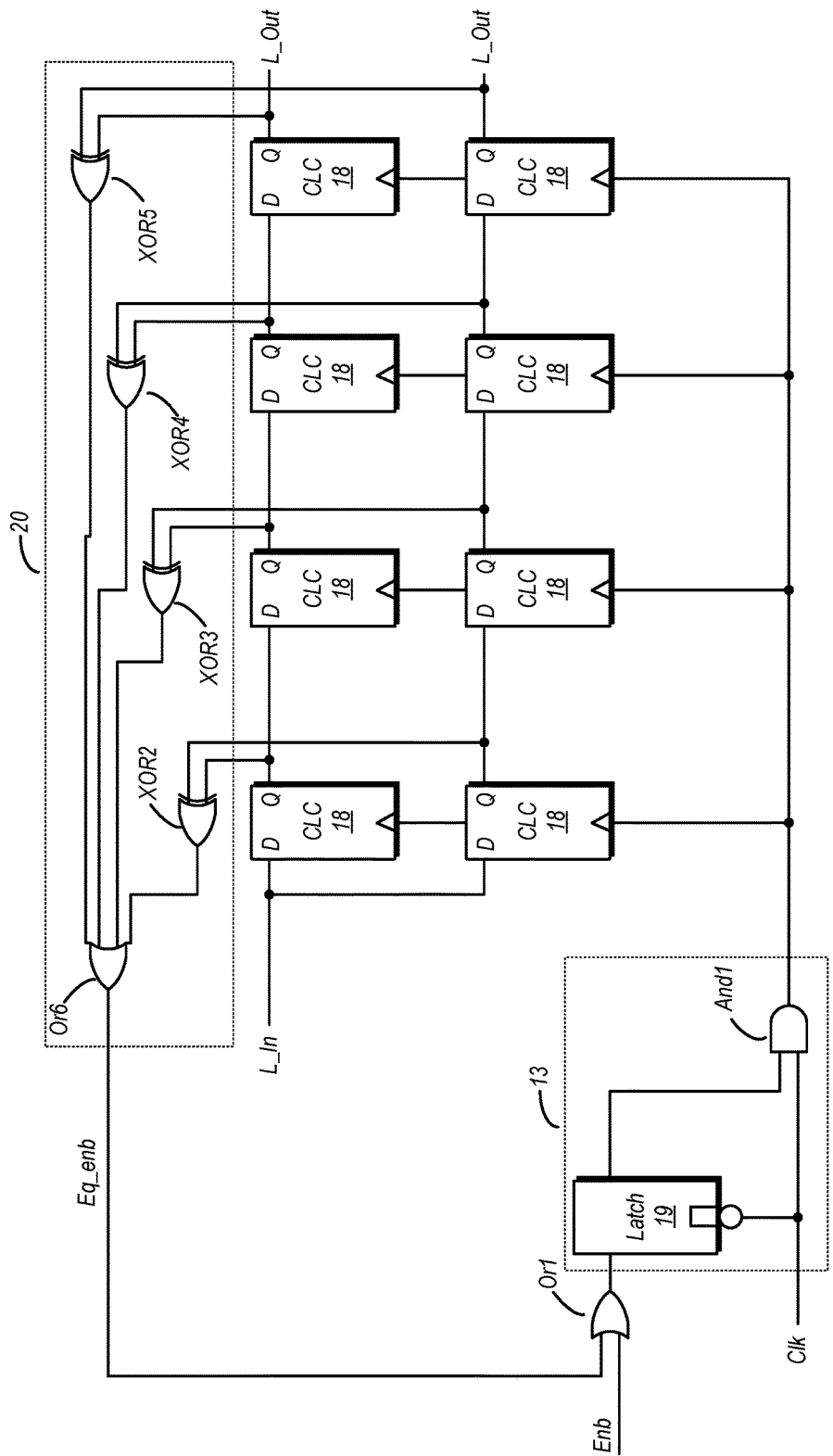
FIG. 5 is a block diagram illustrating an equivalence circuit and two logically equivalent series-coupled chains of clocked logic circuits.

FIG. 5 illustrates another arrangement in which a number of serially-coupled chains of sequential circuits are implemented. In this particular embodiment, there are two different serially-coupled chains of sequential circuits, with each of the chains coupled to receive the same logical input signal, L_In. Each of the chains includes the same number of sequential circuits, and thus each one in a given chain has a counterpart at the same position in the other chain. Accordingly, a given CLC 18 in one chain and its counterpart in the other should have a logically equivalent output at any given time during normal operation.

In this example, equivalence circuit 20 includes an XOR gate for each pair of CLCs 18. XOR2 is coupled to receive the outputs from the first two CLCs 18, XOR3 is coupled to receive outputs from the second two CLCs 18, XOR4 from a third pair of CLCs 18, and XOR5 is coupled to receive outputs from the final two pair of CLCs 18. The outputs of each XOR gate is provided as an input to Orb. If any one of the XOR gates determines that the outputs to which it is coupled to receive are mismatched, it may provide a logic 1 to Orb, thereby causing assertion of the Eq_end signal. As a result, clock gater 13 may allow the clock signal to propagate through to the clock inputs of each CLC 18. In this configuration, it may take a number of clock cycles for the mismatch to clear. However, since equivalence circuit 20 is coupled to detect a mismatch at each stage of the pipeline, it may continue to assert the Eq_enb signal until the mismatch has cleared entirely through the pipeline.

Figure 6:
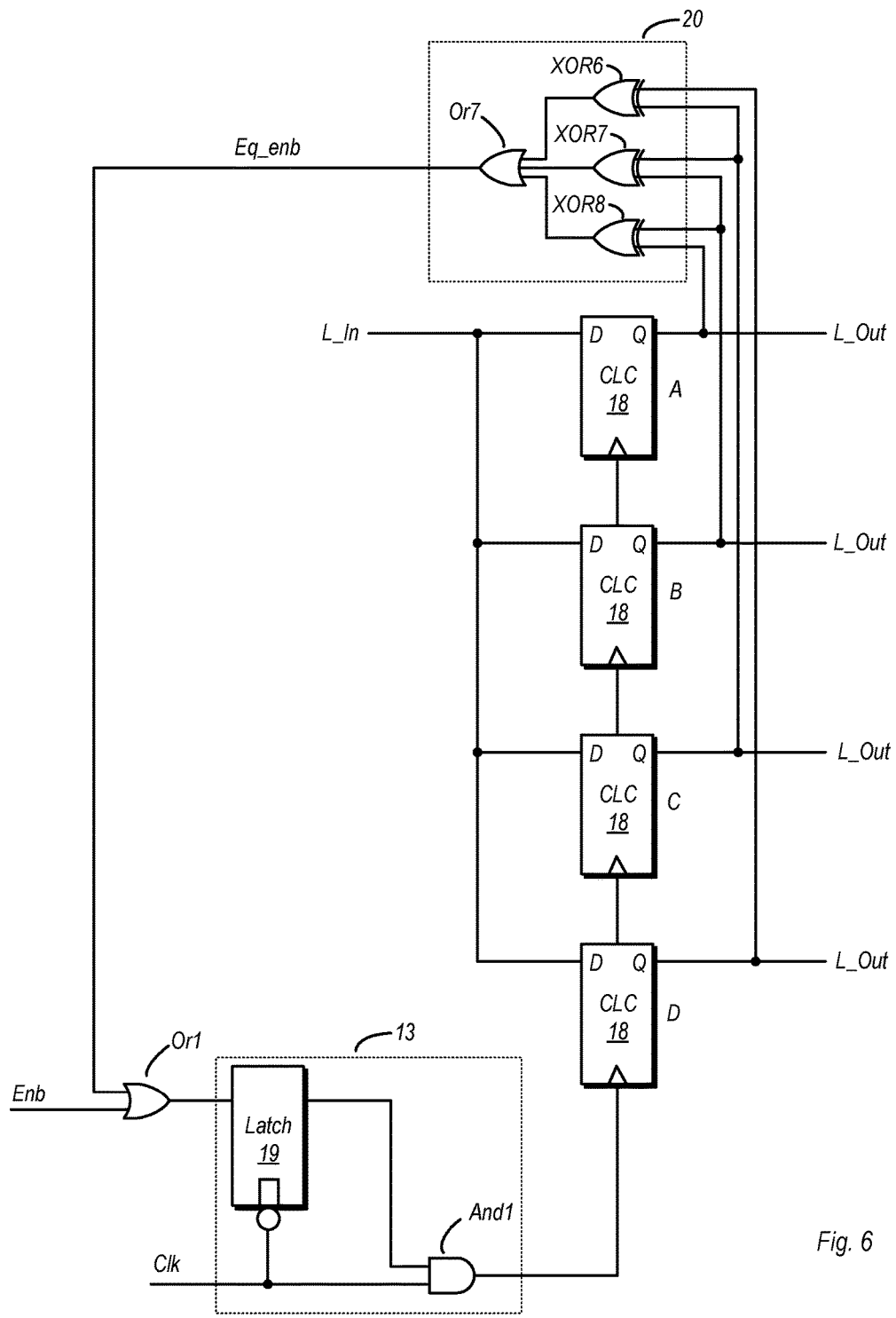
FIG. 6 is a block diagram illustrating an equivalence circuit and a number of replicated clocked logic circuits.

FIG. 6 illustrates an example in which a number of replicated sequential circuits are arranged in parallel. In this example, the parallel CLCs 18 are labeled 'A', 'B', 'C', and 'D'. The outputs of each of CLCs 18 in the illustrated embodiment are each provided to a number of XOR gates in equivalence circuit 20. More particularly, XOR8 is coupled to receive outputs from A and B, XOR7 is coupled to receive outputs from B and C, while XOR6 is coupled to receive outputs from C and D. Thus, equivalence circuit 20 as shown here determines if A=B, if B=C, and if C=D. If one or more of these is not true, the corresponding XOR gates will assert their respective outputs signals, which are then passed through Or7 to Or1, and thus passing Eq_enb to clock gater 13. Thereafter, clock gater 13 will allow the clock signal to pass to the clock inputs of each of CLCs 18, and thus force their respective outputs to equivalence responsive to a pulse of the clock signal latching the common input, L_in, into each.

The various embodiments of equivalence circuits and replicated sequential circuits as shown above are just a few of many possible implementational examples. In general, any type of circuitry for detecting a difference between one or more instances of a logic signal within a group may be used. The equivalence circuits may be coupled to the various instances of replicated sequential circuits on a group basis (e.g., one equivalence circuit per group of replicated sequential circuits), being adapted to the particular arrangement.

Figure 7:
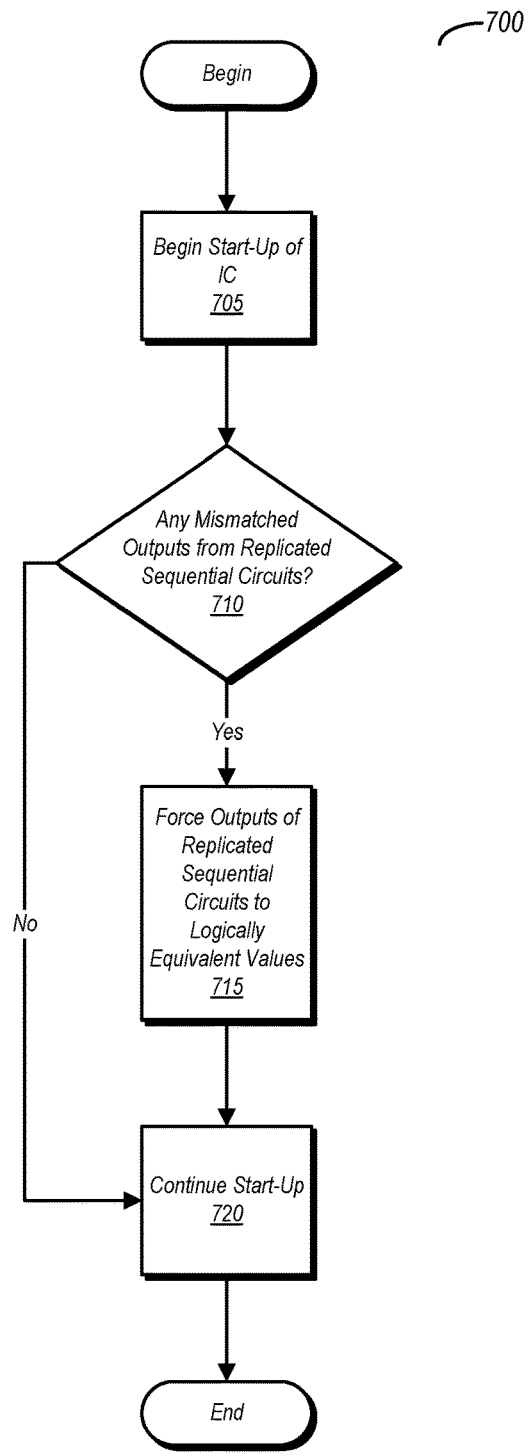
FIG. 7 is a flow diagram illustrating the operation of one embodiment of an equivalence circuit.

FIG. 7 is a flow diagram illustrating the operation of one embodiment of an equivalence circuit. Method 700 as discussed herein may be performed with virtually any embodiment of an equivalence circuit that is coupled to replicated sequential circuits. This includes the examples shown above, as well as any other example not explicitly discussed herein. Method 700 is focused on the start-up of an IC, although the 'start-up' portion may be replaced with 'power-on', and may include operational instances when a given circuit is brought out of a sleep state or power down state Method 700 in the illustrated embodiment begins with the start-up of an IC (block 705). During the start-up, it is possible that the outputs of some replicated (or cloned) sequential circuits within a given group may power up in different states despite the fact that all of them are configured substantially the same and are responsive to the same logic input signals. Thus, the outputs provided by each of the replicated sequential circuits within the given group are checked by an equivalence circuit to determine if there are any logical mismatches. If there are no mismatched outputs among the replicated sequential circuits (block 710, no), then start-up continues as normal for the given group of sequential circuits.

If mismatches are detected among the outputs of the replicated sequential circuits (block 710, yes), then the equivalence circuit may provide one or more signals that force the outputs of that group of replicated sequential circuits to logically equivalent values (block 715). The forcing of outputs of a group of replicated sequential circuits may be performed in any suitable manner, including those discussed above.

It is noted that while FIG. 7 is directed to operation during a start-up of the IC, the equivalence circuitry may in some cases function during normal operation, in the event of a soft error. For example, if a soft error forces two otherwise equivalent outputs into a non-equivalent state, the equivalence circuitry may ensure that a clock pulse is provided to the replicated sequential circuits to correct the error in the manner of the various embodiments that fall within the scope of this disclosure, including those discussed herein.

Figure 8:
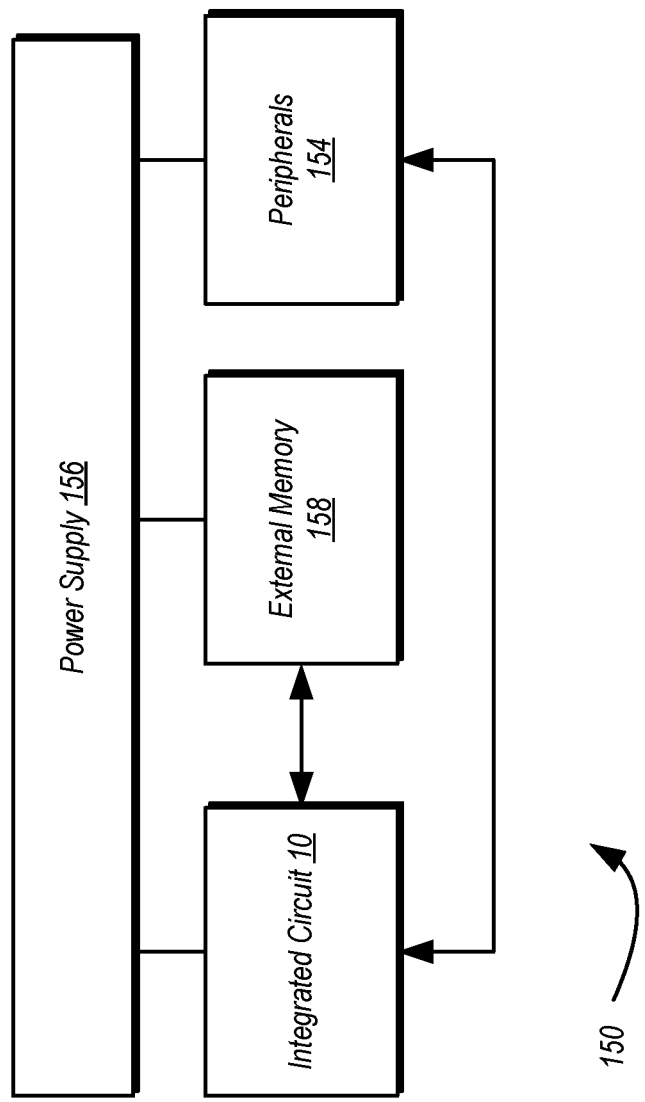
FIG. 8 is a block diagram of one embodiment of an exemplary system.

Turning next to FIG. 8, a block diagram of one embodiment of a system 150 is shown. In the illustrated embodiment, the system 150 includes at least one instance of an integrated circuit 10 coupled to external memory 158. The integrated circuit 10 may include a memory controller that is coupled to the external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. An integrated circuit comprising:
a first clocked logic circuit;
a second clocked logic circuit, wherein the first and second clocked logic circuits are coupled to receive a clock signal, and are each configured to produce equivalent logical outputs based on a common set of logic inputs; and
an equivalence circuit coupled to the first and second clocked logic circuits, wherein the equivalence circuit is configured to, prior to distributing the clock signal to the first and second clocked logic circuits, detect a logical difference between an output of the first clocked logic circuit and an output of the second clocked logic circuit, and, responsive to detecting the logical difference, cause the output of the first clocked logic circuit to be equivalent to the output of the second clocked logic circuit, wherein the equivalence circuit is further configured to, responsive to detecting the logical difference, cause a pulse of the clock signal to be applied to both the first and second clocked logic circuits to cause a logical equivalency between the output of the first clocked logic circuit and the output of the second clocked logic circuit.

2. The integrated circuit as recited in claim 1, wherein the equivalence circuit is configured to, responsive to detecting the logical difference, enable a clock gating circuit to pass the clock signal to the first and second clocked logic circuits.

3. The integrated circuit as recited in claim 1, wherein the equivalence circuit is configured to, responsive to detecting the logical difference, enable a plurality of clock gating circuits to pass the clock signal to the first and second clocked logic circuits, wherein the plurality of clock gating circuits are part of a clock tree, with each of the clock gating circuits at different levels of the clock tree.

4. The integrated circuit as recited in claim 1, wherein a logic input to the first clocked logic circuit is hardwired to a logic input of the second clocked logic circuit.

5. The integrated circuit as recited in claim 1, wherein the first and second clocked logic circuits are coupled to receive equivalent logic inputs from first and second sources, respectively, the first and second sources being physically separate entities, and wherein the equivalence circuit is further configured to, during a start-up phase, force equivalence of the logic inputs provided to the first and second clocked logic circuits.

6. The integrated circuit as recited in claim 1, further comprising a plurality of clocked logic circuits including the first and second clocked logic circuits and at least one additional clocked logic circuit, wherein:
each of the plurality of clocked logic circuits is configured to produce logical outputs that are equivalent to those of other ones of the plurality of clocked logic circuits; and
the equivalence circuit is configured to cause respective outputs of each of the plurality of clocked logic circuits to be forced into an equivalent state responsive to detecting that any one of the respective outputs of the plurality of clocked logic circuits is in a different state with respect to any other one of the plurality of clocked logic circuits.

7. The integrated circuit as recited in claim 1, further comprising a first plurality of clocked logic circuits, including the first clocked logic circuit, coupled in series, and a second plurality of clocked logic circuits, including the second clocked logic circuit, coupled in series, wherein the first and second pluralities of clocked logic circuits are each coupled to receive the clock signal and are further arranged in pairs, and wherein the equivalence circuit is configured to, responsive to detecting a logical difference within any pair of clocked logic circuits, cause pulses of the clock signal to be applied to each of first plurality of clocked logic circuits and each of the second plurality of clocked logic circuits until no logical difference is detected.

8. A method comprising:
detecting, in an integrated circuit, a difference between a logical output from a first clocked logic circuit and a second clocked logic circuit, wherein the first and second clocked logic circuits are configured to produce equivalent logical outputs based on a common set of logic inputs, and wherein each of the first and second clocked logic circuits are coupled to receive a clock signal, wherein said detecting is performed during a start-up of the integrated circuit and prior to distribution of the clock signal to the first and second clocked logic circuits;
responsive to detecting the difference in logical outputs from the first and second clocked logic circuits, an equivalence circuit causing the logical output of the first clocked logic circuit to be equivalent to the logical output of the second clocked logic circuit, wherein causing the logical output of the first clocked logic circuit to be equivalent to the logical output of the second clocked logic circuit comprises the equivalence circuit causing a pulse of the clock signal to be applied to both the first and second clocked logic circuits.

9. The method as recited in claim 8, wherein causing the pulse of the clock signal to be applied to both of the first and second clocked logic circuits comprises enabling a clock gating circuit to pass the clock signal to the first and second clocked logic circuits.

10. The method as recited in claim 8, wherein causing the pulse of the clock signal to be applied to both of the first and second clocked logic circuits comprises enabling a plurality of clock gating circuits within a clock tree, wherein each of the plurality of clock gating circuits is at a different level in the clock tree with respect to others ones of the plurality of clock gating circuits.

11. The method as recited in claim 8, further comprising:
the first clocked logic circuit receiving a first logic signal from a first source;
the second clocked logic circuit receiving a second logic signal from a second source that is physically separate from the first source, wherein the first and second sources are configured to provide the first and second logic signals as logically equivalent values;
responsive to detecting a logical difference between the first and second logic signals, the equivalence circuit forcing each of the first and second logic signals to a same logic state.

12. The method as recited in claim 8, further comprising:
the equivalence circuit causing outputs of each of a plurality of clocked logic circuits to be forced into an equivalent state responsive to detecting that an output of any one of the plurality of clock logic circuits is in a different state than any other one of the plurality of clock logic circuits, the plurality of clocked logic circuits including the first and second clocked logic circuits and at least one other clocked logic circuit, wherein the plurality of clocked logic circuits are coupled to receive the clock signal and produce their respective logical outputs based on the common set of logic inputs.

13. The method as recited in claim 8, further comprising the equivalence circuit causing a plurality of pulses to be provided to each of a first plurality of clocked logic circuits and a second plurality of clocked logic circuits, the first plurality of clocked logic circuits forming a first series-coupled chain and including the first clocked logic circuit, and the second plurality of clocked logic circuits forming a second series-coupled chain including the second clocked logic circuit.

14. An integrated circuit comprising:
a first flip-flop circuit coupled to receive a logic input and a clock signal;
a second flip-flop circuit coupled tor receive the logic input and the clock signal, wherein the first and second flip-flop circuit are configured to produce respective output signals at logically equivalent values based on a logic value of the logic input; and
an equivalence circuit configured to, during a start-up of the integrated circuit and prior to full distribution of the clock signal, detect a logical difference between an output signal provided by the first flip-flop circuit and an output signal provided by the second flip-flop circuit, and, responsive to detecting the logical difference, cause the output signals from the first and second flip-flop circuits to be forced to an equivalent logic state, wherein the equivalence circuit is configured to, responsive to detecting the logical difference, cause one or more clock gating circuits at different levels within a clock tree to pass the clock signal to the first and second flip-flop circuits.

15. The integrated circuit as recited in claim 14, wherein the equivalence circuit is configured to:
assert one or more enable signals responsive to detecting the logical difference; and
discontinue asserting the one or more enable signals responsive to determining that the logical difference has been cleared.

16. The integrated circuit as recited in claim 14, wherein the equivalence circuit is configured to detect the logical difference between any one of a plurality of flip-flop circuits and one or more other ones of the plurality of flip-flop circuits, the plurality of flip-flop circuits including the first flip-flop circuit, the second flip-flop circuit, and one or more additional flip-flop circuits.

17. The integrated circuit as recited in claim 14, further comprising:
a first plurality of flip-flop circuits, including the first flip-flop circuit, coupled together in series; and
a second plurality of flip-flop circuits, including the second flip-flop circuit, coupled together in series;
wherein the equivalence circuit is configured to cause one or more pulses of the clock signal to be applied to each of the first and second pluralities of flip-flop circuit responsive to detecting a logic difference between any one of the first plurality of flip-flop circuits and a counterpart one of the second plurality of flip-flop circuits.

\* \* \* \* \*